March 17, 1970　　　A. E. JACKSON　　　3,501,232
SLIDE PROJECTOR INCLUDING TWO LIGHT
PATHS AND ONE SLIDE MAGAZINE
Filed Aug. 25, 1967　　　3 Sheets-Sheet 1
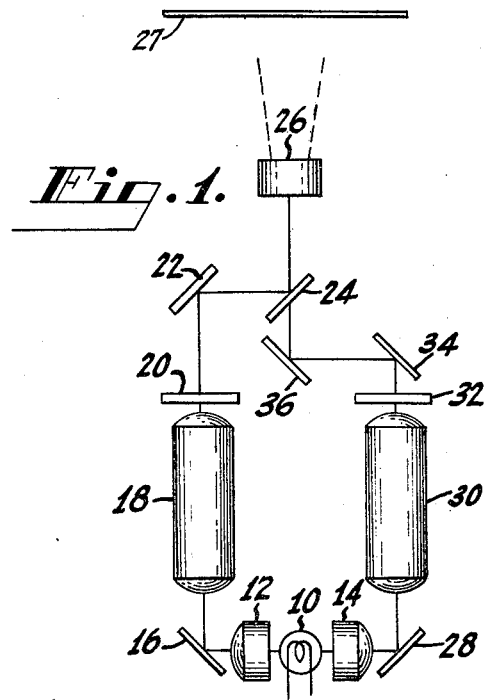
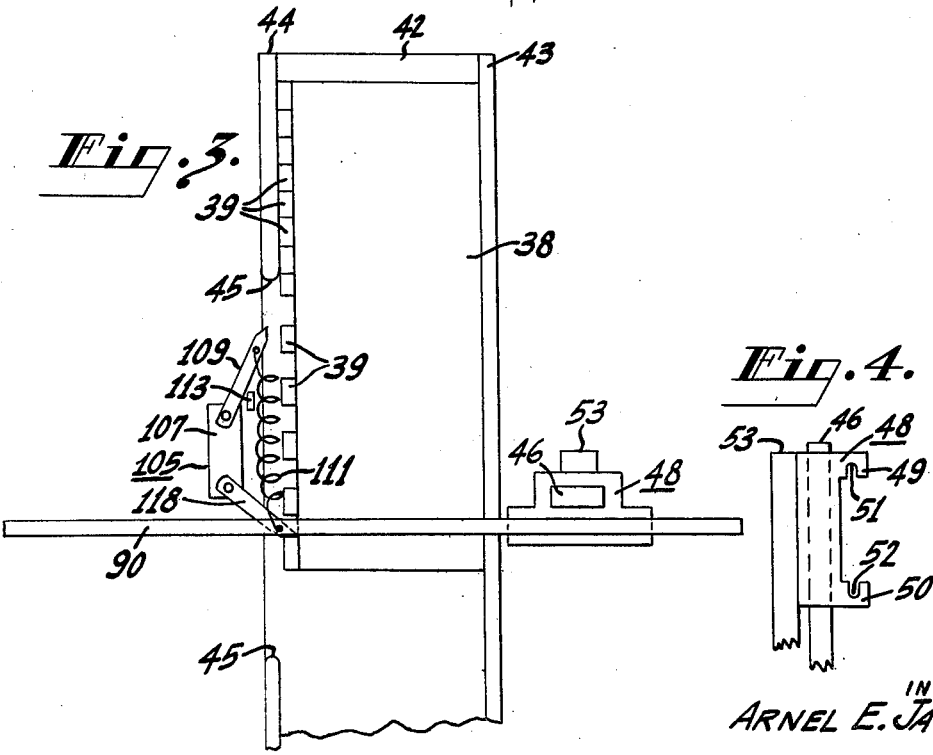
INVENTOR
ARNEL E. JACKSON
BY Simion Yaffee
ATTORNEY

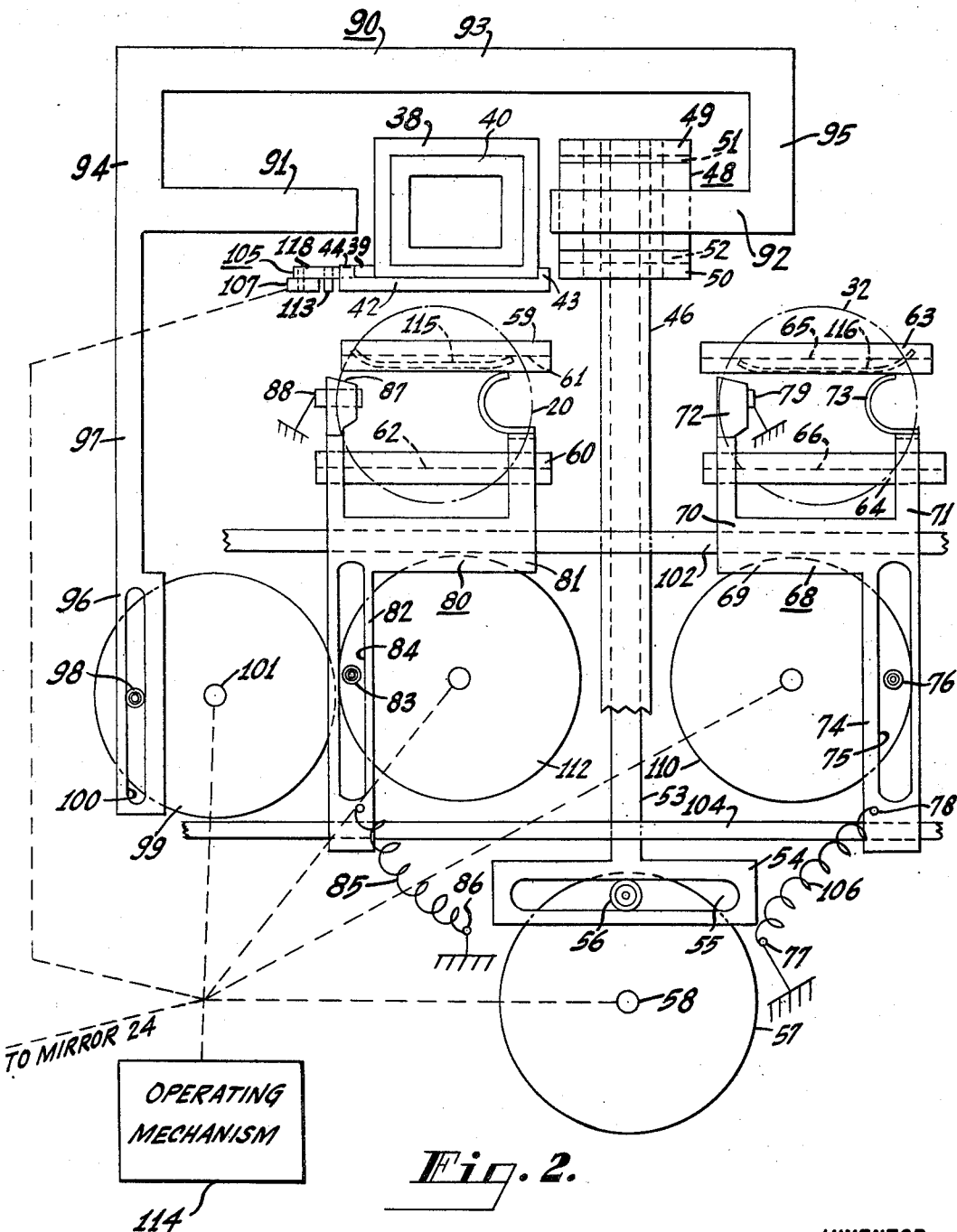

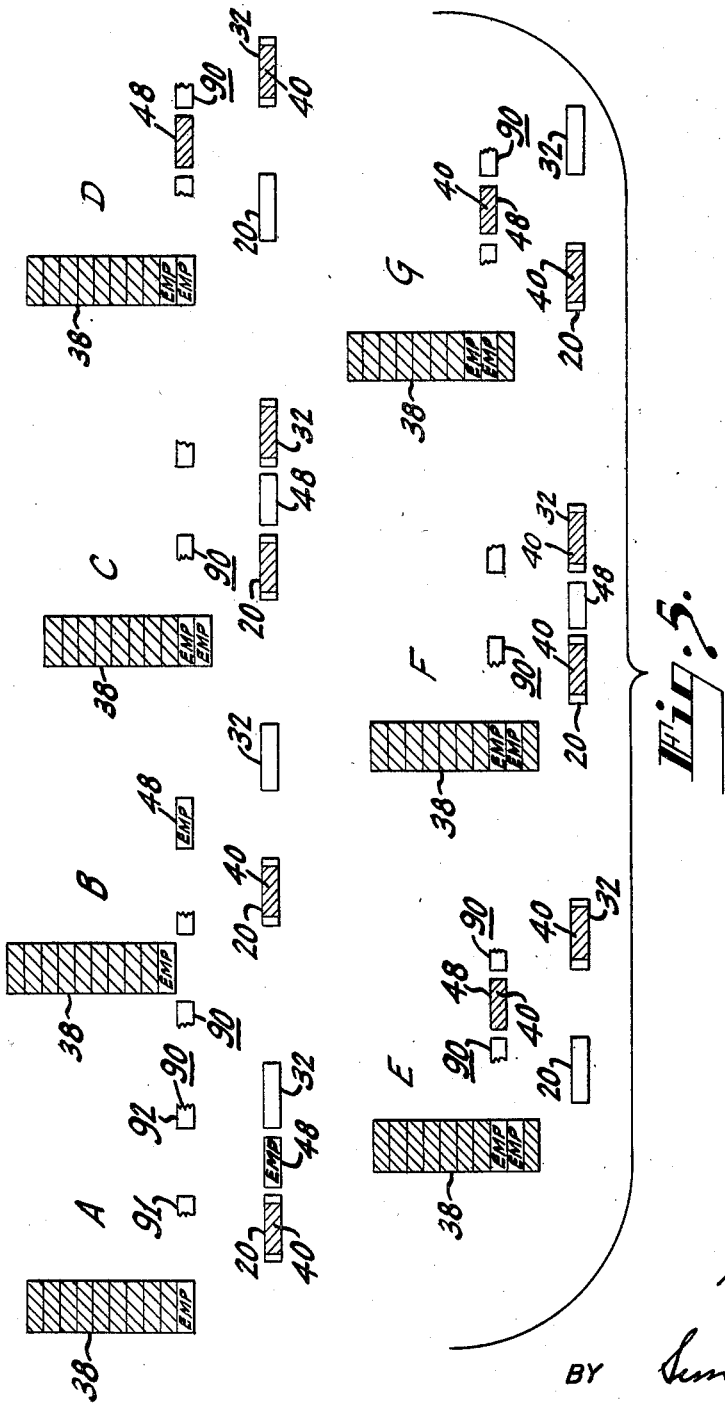

United States Patent Office 3,501,232
Patented Mar. 17, 1970

3,501,232
SLIDE PROJECTOR INCLUDING TWO LIGHT
PATHS AND ONE SLIDE MAGAZINE
Arnel E. Jackson, Audubon, N.J., assignor to RCA Corporation, a corporation of Delaware
Filed Aug. 25, 1967, Ser. No. 663,368
Int. Cl. G03b 21/14
U.S. Cl. 353—82               9 Claims

ABSTRACT OF THE DISCLOSURE

A slide projector for projecting slides alternately from two slide gates onto the same screen area. The slide projector has a single light source, two light paths each having a slide gate and a single magazine. The slides are taken out of the one side only of the magazine and positioned in the two slide gates, projected alternately and put back into the magazine in the same order in which they were originally placed in the magazine.

BACKGROUND OF THE INVENTION

For rapid slide transition during the projection of slides, it has been suggested that successive slides be projected on the same screen either by the use of two projectors alternately or by the use of one projector having a plurality of light paths and a slide gate in each light path. When independent slide magazines are used to supply the slides for the two projectors or for the two light paths, adjacent compartments of each of the two magazines contain slides that are shown alternately. Difficulty is experienced in loading the slides into the magazines in the correct order. When one magazine is used to supply slides manually for both projectors or for both light paths, the projected slides are returned to the magazine in their original order manually after all the slides have been projected, resulting in extra effort and in delay and also in possible error in properly returning the slides to the magazine.

It is an object of this invention to provide a projection system in which slides are taken out of one magazine, projected alternately from two slide gates onto the same screen area, and put back into the same magazine in the same order in which they were originally put into the magazine.

Summary of the invention

In accordance with the invention, means are provided to take a first slide out of a first compartment of a slide magazine and move it into a first projection gate in a light path. Then the magazine is moved backwards one step, that is, the distance between two adjacent compartments. The magazine is next moved two steps forward and a second slide in a second compartment of the magazine is moved into a second gate in a second light path. The magazine is then moved one step backwards and the first slide which had been in the first gate is put back into the same compartment in the magazine from which it was removed. The magazine is moved two steps forward, and the third slide is put into the first gate. The magazine is then moved one step back and the second slide is taken from the second gate and put into the same compartment from which it was removed, the operation continuing in this manner for additional slides in the magazine. The light paths are switched to project the slides therein in an alternate manner. In this manner, slides which are successively positioned in the magazine are successively projected in the same order in which they appeared in the magazine, the slides being returned to the magazine in their original order and in their original compartments.

Brief description of the drawings

The invention will be better understood upon reading the following description when read in conjunction with the accompanying drawing in which:

FIGURE 1 is a schematic plan view of a known projector with which the slide changing mechanism of this invention may be used, FIGURE 2 is a schematic elevational view of a slide changing mechanism comprising this invention and showing the relationship of the slide gates, shown in FIGURE 1, to the slide changing mechanism, FIGURE 3 is a schematic plan view of the slide changing mechanism of FIGURE 2, FIGURE 4 is a side elevational view of a slide holder, and FIGURES 5A to 5G are diagrams useful in explaining the operation of the slide changer to be described.

Description

As shown in FIGURE 1, a projector lamp 10 throws light into a left (as viewed in FIGURE 1) condenser lens system 12 and also into a right condenser lens system 14. The light from the lens system 12 strikes a mirror 16 which is positioned at a 45° angle with respect to the axis of the lens 12. The light striking the mirror 16 is deflected 90° and goes through a focusing lens system 18. The light from the focusing lens system 18 goes through a slide gate 20 and then is reflected back in a direction parallel to the axis of the lens system 12 by another mirror 22. The light then hits a mirror 24 and enters a projection lens 26 and is projected on a screen 27 in a known manner. The mirror 24 is movable in its own plane between a position where the light from the mirror 22 hits the mirror 24 and another position where the light from the mirror 22 does not hit the mirror 24, for a purpose to be explained.

The light from the condenser lens 14 hits a mirror 28 and is directed along a path parallel to the axis of the lens system 18 and also in a direction towards the screen 27. The light reflected from the mirror 28 passes through a lens system 30 and then through a second slide gate 32. After the light has passed through the slide gate 32, the light is reflected by a mirror 34 into a path parallel to the axis of the lens system 14 and in a direction towards the slide gate 20. However, the mirror 34 is so positioned that the path of the light reflected therefrom is closer to the light source 10 than the path of the light reflected from the mirror 22. A mirror 36 is positioned and arranged to reflect the light from the mirror 34 into line with the light from the mirror 24 and also traveling towards the projecting lens 26. Therefore, when the mirror 24 is in its position to reflect the light from the mirror 22 into the projecting lens 26, the mirror 24 blocks the light from the mirror 36, and when the mirror 24 is in its alternate position where it is not in position to reflect the light from the mirror 22, the light from the mirror 36 shines into the projecting lens 26. The slide in the gate 20 or the slide in the gate 32 is projected on the screen 27 when the mirror 24 is in its light reflecting position and when it is in its non-reflecting position, respectively. The above-decribed dual slide projector is known and it is described here only by way of example since such a projector may be used with the slide changer to be described.

The film gates 20 and 32 of FIGURE 2 correspond to the film gates 20 and 32, respectively, in FIGURE 1. A magazine 38 for slides 40 is positioned on a support table 42 which may be above the gate 20 and to one side of the gate 32. This magazine 38 is of the type having parallelly arranged compartments each having open sides so that a slide can be slipped into or out of a compartment from one side thereof by the use of a tool which may be pushed into a compartment from one side of the magazine. The magazine 38 also has teeth 39 (shown in FIGURE 3) along the lower left-hand edge thereof, as viewed in FIGURES 2 and 3, there being one tooth 39 for each slide compartment of the magazine 38, for moving the magazine 38 in a direction parallel to the length thereof. The table 42 has a shoulder 43 thereon which acts as a guide for the lower right-hand edge of the magazine 38 and a shoulder 44 which acts as a guide for the lower left-hand edge of the magazine 38. The shoulder 44 is broken away at 45 as shown in FIGURE 3 for a purpose to be explained.

A guide bar 46 extends above and below the table 42. A slide holder 48 (FIGURES 2, 3 and 4) slides up and down the guide bar 46. The slide holder 48 is open at one side, the right as viewed in FIGURE 4, and at both ends, and has opposed flanges 49 and 50, the opposing faces of which are grooved at 51 and 52 to receive a slide 40. A bar 53 is fixed to the back of the slide holder 48 to move the slide holder 48 up and down along the guide 46.

A Scotch yoke is provided for moving the holder 48 up and down. The lower end of the bar 53 is fixed to a crossbar 54 which has a slot 55 therethrough. A pin 56 which extends laterally from a wheel 57, extends into the slot 56. The wheel 57 rotates about its axis 58, and in so doing causes the bar 53 and holder 48 to move up and down between its top position, where it is in slide exchange position with respect to the magazine 38 and a lower position where it is in slide delivery or pickup position with respect to the gates 20 and 32, as will be more fully explained.

A pair of slide guides 59 and 60, which are fixed in position, are provided to guide a slide 40 into and out of the gate position 20. The opposing surfaces of the guides 59 and 60 are grooved, as indicated by the dotted lines 61 and 62 and the guides 59 and 60 are so spaced as to receive a slide 40 in the grooves therein. A flat spring 115 pushes a slide that is held between the guides 59, and 60 downwardly to properly position the slide in the vertical direction. Similarly a pair of slide guides 63 and 64 having slide receiving grooves 65 and 66 in the opposing surfaces thereof and including a slide positioning spring 116 in the groove 65 are provided to guide a slide into and out of the gate position 32 and to locate the slide in a vertical direction.

A right-hand slide pusher 68 is provided to push a slide 40 from the holder 48 into gate position 32. This pusher 68 comprises a base member 69 having two upstanding portions 70 and 71 at the ends thereof. The upstanding portion 70 extends upward so that the top portion 72 thereof is substantially halfway between the stationary guides 63 and 64. The top portion 72 may be of trapezoidal form as shown. While the portion 70 is positioned in front of the guides 63 and 64, as viewed in FIGURE 2, so as not to interfere with the guides 63 and 64, the portion 72 is positioned between the guides 63 and 64 so that the portion 72 will contact any slide that is held between the guides 63 and 64. The other upstanding portion 71 is similarly positioned in front of the guide 64. A leaf spring 73 is fixed to the top of the portion 71 and is positioned to contact an edge, the right-hand edge as viewed in FIGURE 2, of a slide that is held between the guides 63 and 64 and to urge the slide to the left as viewed in FIGURE 2. A bar 74 having a slot 75 therein extends downwardly from the base member 69. A pin 76 fits loosely into the slot 75. This pin 76 extends from a wheel 110 whereby the pin 76 moves with the wheel 110 from which it extends. Rotation of the wheel 110 causes the pusher 68 to move from the one extreme position where it holds a slide in the gate position 32 to another extreme position where it straddles the holder 48. The pin 76, being loose in the slot 75, permits final positioning of the holder 68 as will be explained.

The pusher 68 slides on guide bars 102 and 104, the guide bar 102 extending through the base member 69 and the guide bar 104 extending through the lower end of the member 74. A compression spring 106, one end of which is fixed to an anchor 77 and the other end of which is fixed to the member 74 as by a pin 78, pushes the pusher 68 to the right when the pusher 68 is to the right of the anchor 77, and the spring 106 pushes the pusher 68 to the left when the pusher is to the left of the anchor 77. A stop member 79 mounted by suitable means, not shown, in a fixed, immovable position is so positioned that it stops motion of the portion 72 of the pusher 68 to the right at the position to properly project a slide that is held between the guides 63 and 64. The stop 79, however, is out of the way of any slide that may be held between the guides 63 and 64. The stop 79 stops the holder 68 at its proper extreme right position for proper positioning of a slide 40 that is held in the holder 68 with respect to the gate position 32.

A left-hand pusher 80 is provided to push slides between one position where they are in the gate position 20 and another position where they are in the holder 48. The base member 81 of the pusher 80 slides on the guide bar 102 and the lower end of the downwardly extending slot member 82 slides on the guide bar 104. A pin 83 which extends laterally from a wheel 112 moves the pusher 80 between its two positions, it again being noted that the pin 83 fits loosely in the slot 84 of the member 82. A compression spring 85 acts to push the pusher 80 to the right or to the left depending on whether the pusher is to the right or to the left of the anchor 86 for the spring 85. The pusher 80, however, differs from the pusher 68 in that the top portion 87 of the left-hand member of the pusher bar 80 is slotted to receive a fixed immovable stop member 88. Therefore, when the pusher 80 moves to the left, any slide that is pushed thereby between the guides 59 and 60 is stopped by the end of the fixed stop 88 in its correct final left-hand position for proper projection thereof.

A slide pusher 90 is provided to push a slide 40 back and forth between the magazine 38 and the holder 48, when the holder 48 is in slide exchange position with respect to the magazine 38. This pusher 90 comprises a pair of aligned lower bars 91 and 92 and an upper bar 93, the lower bars 91 and 92 being joined to the upper bar 93 by vertically extending bars 94 and 95, respectively. The ends of the lower bars 91 and 92 are so spaced as to clear or straddle the magazine 38. The bar 91 is also small enough in cross sectional size as to slide through a compartment of the magazine 38. The vertical bars 94 and 95 are spaced so that neither interferes with either the magazine 38 or the holder 48. The rods 91 and 92 are long enough so that they can push a slide out of the magazine 38 into the holder 48 or vice versa. The pusher 90 is moved by a mechanism such as a Scotch yoke comprising a slotted member 96 at the end of a bar 97 forming a downward extension of the bar 94. A pin 98 which extends laterally from a wheel 99 fits the slot 100 in the slotted member 96. Rotation of the wheel 99 about its axis 101 causes motion of the pusher 90 between a first position where the ends of the rods 91 and 92 straddle the magazine 38 and the second position where they straddle the holder 48.

The magazine 38 is moved forward the distance between three slide holding compartments and it is moved backward the distance between two compartments, that is, the magazine is moved forward two steps and is moved backward one step alternately. This is accomplished by a rachet mechanism 105, (see FIGURE 3), the rachet mechanism comprising a sliding plate 107 which is moved by any suitable mechanism such as a Scotch yoke (not shown) back and forth a little more than the distance between three teeth 39 of the magazine 38, there being one tooth for each magazine compartment. A first pawl 118 is pivoted on the plate 107 and extends slantingly downwards as viewed in FIGURE 3 and towards the teeth 39. A second pawl 109 is pivoted on the plate 107 and extends slantingly upward and towards the teeth 39. A tension spring 111 is provided to urge the free ends of the pawls 118 and 109 towards each other. An adjustable positionable cam 113 is provided to control the operation of the rachet mechanism 105. While this cam 113 is moveable between two positions for a purpose to be explained, it does not move with the mechanism 105. When the rachet mechanism 105 is moved forward, (down in FIGURE 3) the distance between three teeth 39, the magazine 38 will be advanced two steps. However, when the rachet mechanism 105 is moved back the same distance the cam 113 will prevent the tip of the pawl 109 from contacting a tooth 39 and the pawl will not start pushing the magazine 38 back until the pawl 109 has moved to where its motion is not obstructed by the cam 113. The pawl 109 will then contact a tooth 39 and move the magazine back only one step. When the cam 113 is moved from the position shown to a similar position with respect to the pawl 118, motion of the slide mechanism will move the magazine two steps back and one step forward.

The operation of the described slide changer is described in connection with FIGURE 5 as follows:

See FIGURE 5A.—A slide 40 is moved from the first compartment, the lowest one, in the magazine 38 into the holder 48 by the pusher 90 which comprises the pusher rods 91 and 92. The holder 48 goes to its lowest position and the pusher 80, (not shown in FIGURE 5) pushes the slide 40 into the left gate position 20. The mirror 24, (FIGURE 1) may now be moved to its light reflecting position, whereby the slide in gate position 20 is shown on the screen 27.

See FIGURE 5B.—The pusher 90 goes back to where it straddles the magazine 38. The magazine 38 is moved one step backwards by rachet mechanism 105. The pusher 90 then goes to where it straddles the upper position of the holder 48. The holder 48 is now in its down position. The pusher 68 (not shown in FIGURE 5) would then push a slide in gate position 32 into the holder 48, it being assumed for the present discussion that there is actually no slide at the gate position 32 at this time. The holder 48 goes up to its upper position empty, and the pusher 90 goes back into the position where it straddles the magazine 38. The pusher 68 remains in a position halfway between the gates 20 and 32, that is in its central position, until the holder 48 returns to its down position.

See FIGURE 5C.—The magazine 38 is moved by the rachet mechanism 105 two steps forward whereby its second compartment is presented to the pusher 90. The pusher 90 moves the slide from the second compartment into the holder 48. The holder 48 goes to its down position. When the holder 48 arrives at its lower position, the pusher 68 straddles the holder 48. The pusher 68 pushes the slide into the gate position 32 and the mirror 24 may now be moved into the position where the slide in the gate position 32 is projected.

See FIGURE 5D.—The pusher 90 goes back to where it straddles the magazine 38. The magazine goes one step backwards. The pusher 90 goes through the first empty compartment of the magazine 38 to where it will straddle the holder 48 when the holder 48 now at its lower position arrives at its upper position. The pusher 80 pushes the slide in gate position 20 back into the holder 48. The holder 48 then arrives at its upper position.

See FIGURE 5E.—The pusher 90 moves the slide in the holder 48 into the first compartment of the magazine 38 which is the compartment from which it was taken. The magazine is moved two steps forward to present the third compartment to the pusher 90. The pusher pushes the slide from the third compartment into the holder 48.

See FIGURE 5F.—The holder 48 goes to its lower position. The pusher 80, which had arrived at its central position straddles the lower position of the holder 48 as it arrives at this lower position. The pusher 80 moves the slide in the holder 48 into the gate position 20 and the mirror 24 may now be moved to the position where the slide in the gate position 20 is projected on the screen.

See FIGURE 5G.—The pusher 90 goes to where it straddles the magazine 38. The magazine 38 moves back one step. The pusher 90 goes through the second empty compartment to where it straddles the upper position of the holder 48. The slide in the gate position 32 is moved into the holder 48. The holder 48 goes upward and arrives at its upper position after the pusher 90 has reached its holder straddling position. The pusher 90 then pushes the second slide from the holder 48 back into the second compartment of the magazine from which it was taken.

It will be seen that upon continuous operation of the prescribed slide projector, the slides 40 will be taken from the magazine 38 and will be shown alternately in the gate positions 20 and 32 and will be put back into the same compartments of the magazine 38 from which they were taken. Furthermore, upon reversal of the several wheels 57, 99, 110 and 112, and upon reversal of the ratchet mechanism 105, by changing positions of the cam 113, the described slide projector can be reversed, whereby slides 40 previously shown and now in the magazine 38 may be shown again.

While the described slide projector may be set up to run continuously, it may advantageously be set up to change only one slide each time a button or other suitable switch (not shown) is pressed.

Modifications of the above-described apparatus will occur to a person skilled in the art. The support table 42 and the magazine 38 may be positioned either above or below the gate positions 32 and 20 and to either side thereof. Any suitable mechanism, other than the Scotch yoke shown, may be provided for moving the various moveable elements described hereinabove. The ratchet means 105 for moving the magazine 38 is merely illustrative of one type of magazine moving means. Any known mechanism such as the operating mechanism 114 can serve by conventional mechanical or other interconnecting and driving means, represented in FIGURE 2 by dotted lines, to rotate the several wheels, 57, 99, 110 and 112 and move the ratchet mechanism 105 and the mirror 24 in proper timed relation as described above. Therefore, the above description is to be considered as illustrative and not in a limiting manner.

What is claimed is:

1. A slide projector of the type including means for supporting a magazine having compartments for receiving slides, said slide projector having two light paths,
   means to move a slide out of one side only of a compartment of a unitary magazine and to position said slide in one of said light paths and to return said slide to a slide compartment of said unitary magazine, and
   means to move another slide out of said one side of a further compartment of said unitary magazine and to position said other slide in said other light path and to return said other slide to a compartment of said unitary slide magazine.

2. The invention as expressed in claim 1 in which said two slide moving means include a slide pusher and means are provided for moving said magazine two steps forward to present an additional compartment to said slide pusher and to move said magazine one step backward to present an adjacent compartment to said slide pusher.

3. The invention as expressed in claim 1 in which said slide moving means comprises a slide pusher, said slide pusher having two opposed arms which are separated by a distance at least equal to the width of said slide magazine, one of said opposed arms being long enough to extend through a compartment of said slide magazine.

4. The invention as expressed in claim 1 in which said slide moving means comprises a slide pusher, said slide pusher having two opposed arms which are separated by a distance at least equal to the width of said slide magazine, one of said opposed arms being long enough to extend through a compartment of said slide magazine, and in which said slide moving means includes a slide holder positioned so that said slide pusher moves a slide from a compartment into said slide holder.

5. The invention as expressed in claim 1 in which said means to return said slides returns each slide to the same magazine compartment from which it was taken.

6. The invention as expressed in claim 1 in which said two slide moving means include a slide pusher and means are provided for moving said magazine two steps forward to present an additional compartment to said slide pusher and to move said magazine one step backward to present an adjacent compartment to said slide pusher, and in which means are provided for reversing said magazine moving means whereby it is moved two steps backwards and one step forward to provide reverse order projection of the slides from the single magazine.

7. The invention as expressed in claim 1 in which means are provided to position a slide both vertically and horizontally in each of said light paths.

8. A slide projector of the type including means for supporting a magazine having compartments for receiving slides, said slide projector having two light paths,
   means to move a slide out of a magazine compartment and to position said slide in one of said light paths and to return said slide to a slide magazine compartment, and
   means to move another slide out of a further magazine compartment and to position said other slide in said other light path and to return said other slide to a slide magazine compartment,
   said slide moving means comprising a slide pusher, said slide pusher having two opposed arms which are separated by a distance at least equal to the width of said slide magazine,
   one of said opposed arms being long enough to extend through a compartment of said slide magazine,
   said slide moving means also comprising a holder positioned so that said pusher moves a slide from said magazine into said holder and
   additional pusher means to move slides from said holder into one or the other of said light paths.

9. A slide projector having two light paths comprising, means for positioning a single unitary magazine having compartments for receiving slides,
   means for moving said slides from one side only of said magazine into said respective light paths, and
   means for moving said magazine timed to cause said first-mentioned moving means to move said slides from said magazine alternately into said light paths in the order in which they appear in said magazine while returning each slide to the said one side of said magazine and to the same compartment of said magazine from which it was taken.

References Cited

UNITED STATES PATENTS

| | | | |
|---|---|---|---|
| 2,756,630 | 7/1956 | Goldberg | 353—116 |
| 2,990,750 | 7/1961 | Zillmer | 353—114 |
| 3,093,030 | 6/1963 | Carrillo | 353—86 |
| 3,161,109 | 12/1964 | Carrillo | 353—86 |
| 3,194,115 | 7/1965 | Giwosky | 353—83 |
| 3,216,138 | 11/1965 | Walter | 353—116 XR |
| 3,369,452 | 2/1968 | Grenier | 353—90 |

NORTON ANSHER, Primary Examiner

ROBERT P. GREINER, Assistant Examiner

U.S. Cl. X.R.

353—86, 90, 94, 116